United States Patent [19]

Morita et al.

[11] Patent Number: 4,823,342

[45] Date of Patent: Apr. 18, 1989

[54] TIME DIVISION EXCHANGE SYSTEM HAVING FUNCTIONS OF COMPRESSING AND EXPANDING INFORMATION

[75] Inventors: Takashi Morita; Koji Hirai; Akira Kusaba, all of Yokohama, Japan

[73] Assignee: Hitachi, Ltd., Tokyo, Japan

[21] Appl. No.: 12,175

[22] Filed: Feb. 9, 1987

[30] Foreign Application Priority Data

Feb. 7, 1986 [JP] Japan .................................. 61-23706

[51] Int. Cl.⁴ .......................................... H04J 3/18
[52] U.S. Cl. .................................... 370/109; 370/58; 370/79
[58] Field of Search .................. 370/109, 79, 80, 81, 370/58, 110.1; 375/30

[56] References Cited

U.S. PATENT DOCUMENTS

| | | | |
|---|---|---|---|
| 4,630,257 | 12/1986 | White | 370/109 |
| 4,661,946 | 4/1987 | Takahashi et al. | 370/58 |
| 4,675,863 | 6/1987 | Paneth et al. | 370/109 |
| 4,704,629 | 11/1987 | Vreeswijk et al. | 370/109 |

FOREIGN PATENT DOCUMENTS

0071918  6/1977  Japan .................................. 370/109

Primary Examiner—Douglas W. Olms
Assistant Examiner—Melvin Marcelo
Attorney, Agent, or Firm—Antonelli, Terry & Wands

[57] ABSTRACT

A time division exchange provided with a plurality of compression circuits for carrying out signal compression in accordance with a plurality of compression laws and a plurality of expansion circuits for carrying out signal expansion in accordance with a plurality of expansion laws is operated in the following manner. In a case where the exchange is used as an originating exchange, a compression circuit provided in the originating exchange for carrying out signal compression according to a desired compression law is selectively used at each time slot, and information on the desired compression law is sent out from the originating exchange. Further, in a case where the exchange is used as a destination exchange, an expansion law to be used on the receiving side is selected on the basis of the above information, and an expansion circuit provided in the destination exchange for carrying out signal expansion according to the selected expansion law is selectively used at each time slot.

8 Claims, 7 Drawing Sheets

FIG. 5a
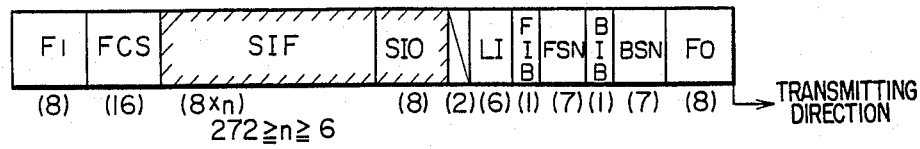
FIG. 5b
[SIF for SIO=TUP]
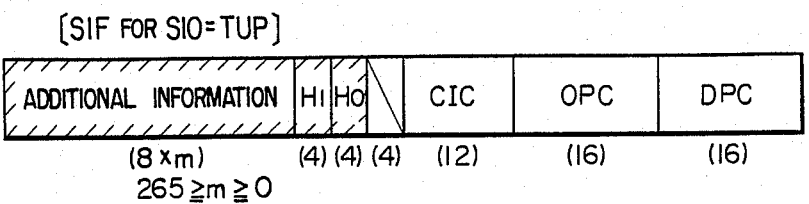
FIG. 5c
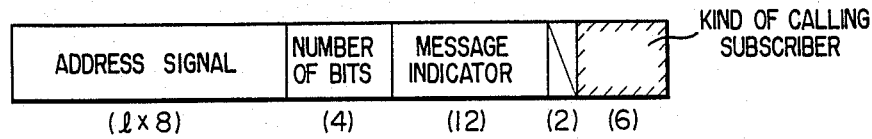
FIG. 5d
| F E D C B A | MEANING (DEFINITION) | REMARKS |
|---|---|---|
| 1 0 0 0 0 0 | NO SIGNAL COMPRESSION | |
| 1 0 0 0 0 1 | SIGNAL COMPRESSION ACCORDING TO A-COMPRESSION LAW | |
| 1 0 0 0 1 0 | SIGNAL COMPRESSION ACCORDING TO B-COMPRESSION LAW | |
| 1 0 1 X X X | COMPRESSION COUNTER FOR A-COMPRESSION LAW | X X X INDICATES NUMBER OF COUNTS |
| 1 1 0 X X X | COMPRESSION COUNTER FOR B-COMPRESSION LAW | X X X INDICATES NUMBER OF COUNTS |

TIME DIVISION EXCHANGE SYSTEM HAVING FUNCTIONS OF COMPRESSING AND EXPANDING INFORMATION

BACKGROUND OF THE INVENTION

The present invention relates to a communication system in which signal compression and signal expansion are required, and more particularly to a time division exchange which can compress and expand information and is suitable for use in the above communication system.

In a digital network, as described in, for example, Japanese patent application JP-A-No. 57-101,464, a signal to be transmitted is usually compressed, to utilize a transmission line efficiently. In more detail, an original signal (that is, a voice signal or a video signal) is compressed so that the information quantity of the signal becomes less than the ordinary information quantity thereof (for example, the ordinary information quantity of a voice signal having been subjected to pulse code modulation is 64 Kbps). The compressed signal is send out, and then decoded on the receiving side so as to obtain a signal which is substantially the same as the original signal. In a case where multiplex communication is made with the use of a single transmission line, the above method is very useful. In this case, however, it is required to previously assign one of the compression laws to each time slot, on the transmitting side, and to previously assign one of the expansion laws which corresponds to the compression law, to each time slot, on the receiving side. Accordingly, when the traffic expected for each compression law varies, the number of vacant time slots increases, and thus the transmission efficiency is reduced. Further, a queue is generated, and thus the communication service is degraded.

Further, as described in Japanese patent Application JP-A-No. 58-195,337, a switch is added to the above-mentioned collection/delivery apparatus, to make it possible to selectively use one of the blocks which are included in the apparatus. In this apparatus, however, not every time slot is subjected to signal compression or signal expansion. Accordingly, the above apparatus having switching means is ineffectual for variations in traffic.

That is, in these conventional techniques, no attention is paid to variations in traffic. Accordingly, in a case where a great change in traffic increases the number of calls which require specified compression and expansion laws, the transmission efficiency is reduced, and the communication service is degraded by the generation of a queue.

SUMMARY OF THE INVENTION

It is an object of the present invention to provide a time division exchange system which can utilize a digital link without reducing the transmission efficiency thereof, even when traffic is varied.

In order to attain the above object, according to the present invention, there is provided a time division exchange system which includes at least one compression circuit for carrying out signal compression according to one of the compression laws and at least one expansion circuit for carrying out signal expansion according to one of expansion laws and in which a compression circuit for carrying out signal compression according to one of the compression laws is selectively used in each time slot in accordance with variations in traffic. Information on the compression law being used, is sent to the receiving side in the corresponding time slot. An expansion law to be used on the receiving side is determined on the basis of the above information, and an expansion circuit for carrying out signal expansion according to the above expansion law is used in each time slot.

That is, in the above-mentioned time division exchange system, a compression law to be used on the transmitting side is determined on the basis of user identifying information (such as data from a user, the kind of voice, and a previously-programmed class), destination information (such as route information), the present traffic, and others. A compression circuit for carrying out signal compression according to the compression law is selectively used for an input signal at each time slot, with the aid of the switching function of the time division private branch exchange (namely, time division PBX) on the transmitting side, and information on the compression law which has been used, is sent out from the above PBX to the time division PBX on the receiving side. Thus, an expansion law to be used is selected on the basis of the above information, and an expansion circuit for carrying out signal expansion according to the expansion law is selectively used for the received signal at each time slot, with the aid of the switching function of the PBX on the receiving side, to reproduce original information or an original signal.

According to the present invention, a compression circuit for compressing user's information or a signal, is determined on the basis of information given to the time division PBX on the transmitting side. Accordingly, a plurality of compression laws can be successively selected, and it is not required to fix a compression law for a medium which carries user's information. Further, it is not required to previously assign some of the links between the PBX on the transmitting side and the PBX on the receiving side to a compression law, and to previously assign other ones of the links to another compression law.

As mentioned above, a compression law for transmitting information dynamically can be determined at each call. Accordingly, variations in traffic will neither reduce the transmission efficiency nor degrade the communication service.

BRIEF DESCRIPTION OF THE DRAWINGS

FIGS. 5a to 5d show an example of a common channel signal between two PBX's.

DESCRIPTION OF THE PREFERRED EMBODIMENT

Figure 1:
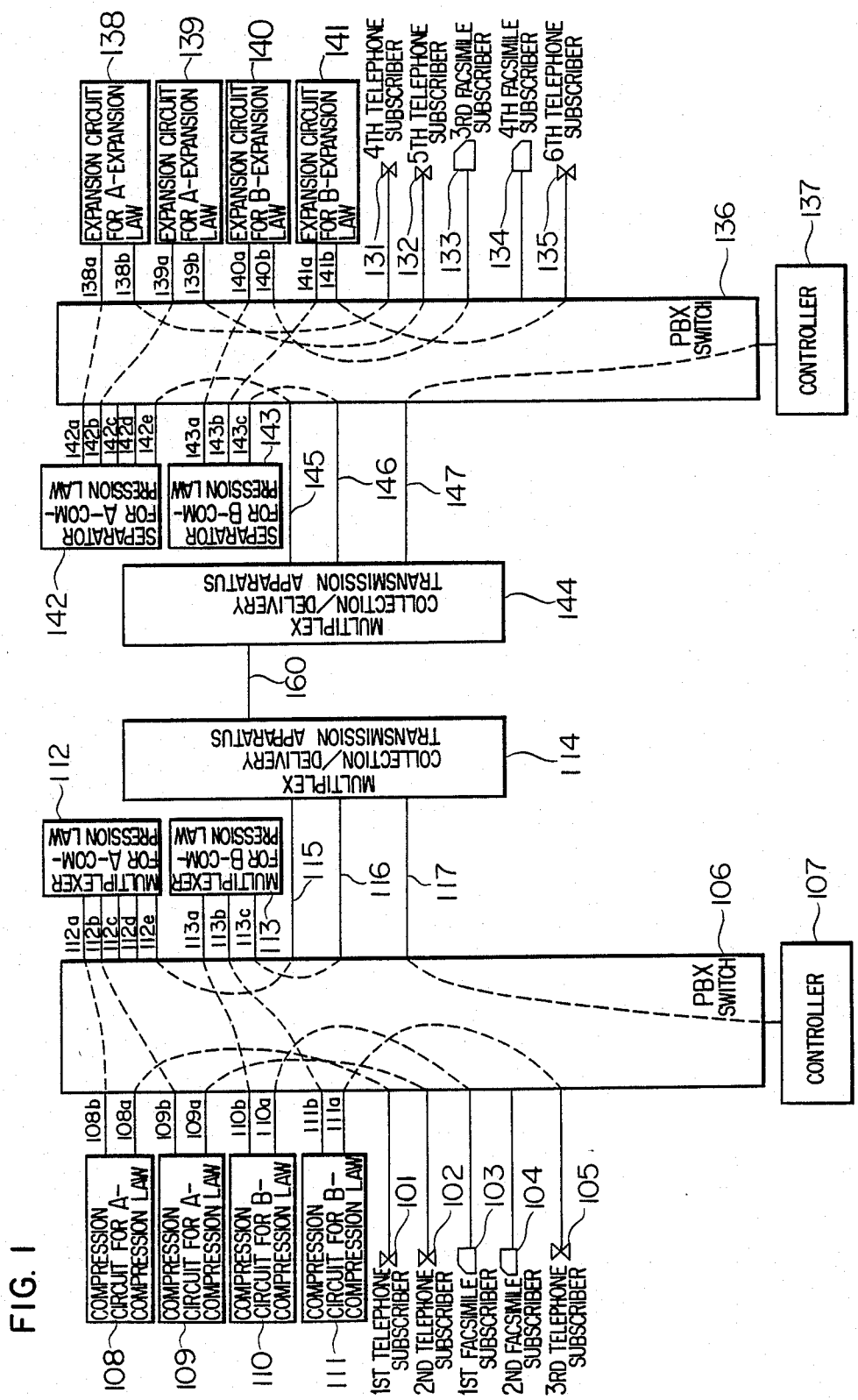
FIG. 1 is a block diagram for explaining an example of communication carried out in an embodiment of a time division exchange system according to the present invention.
Figure 2:
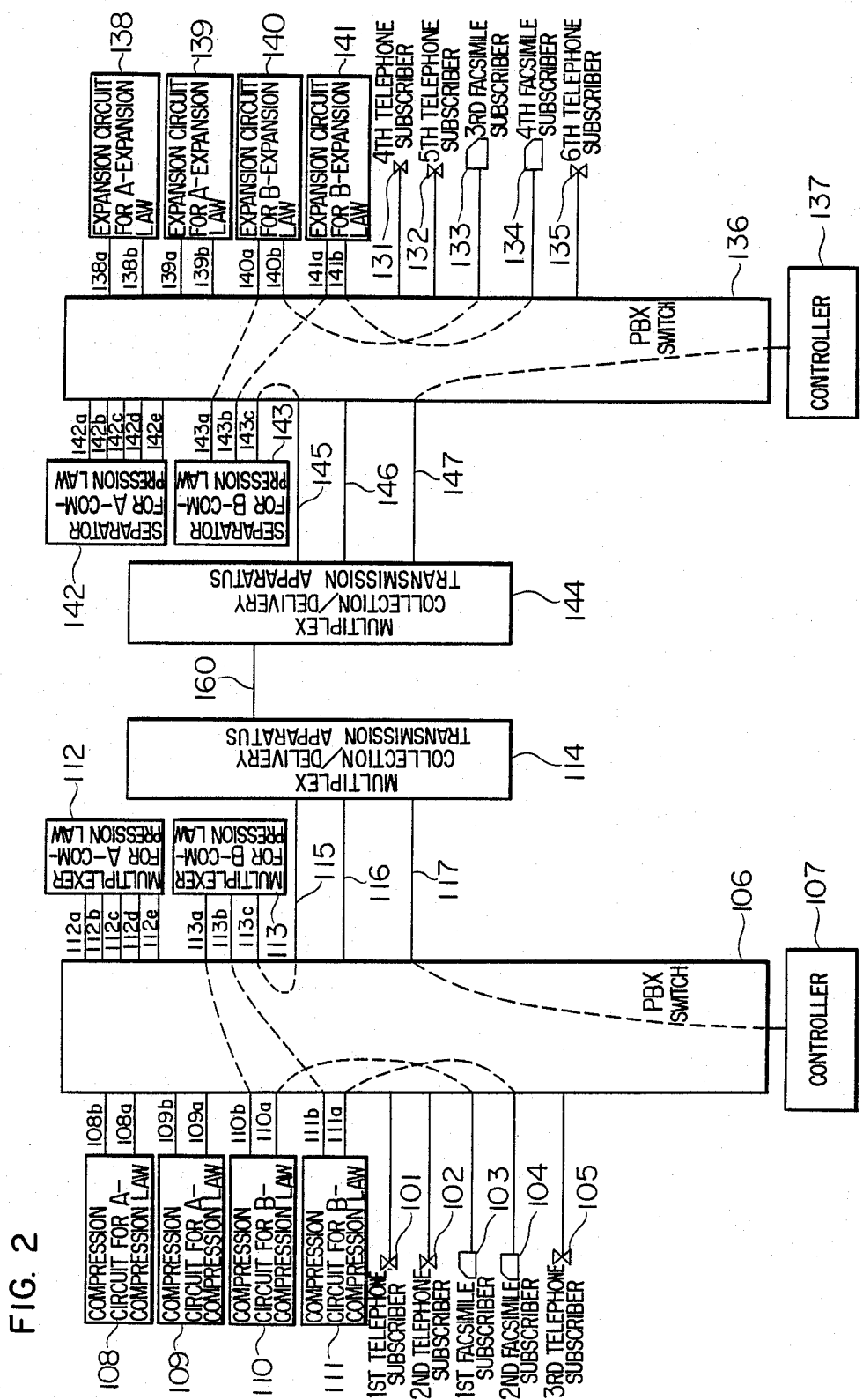
FIG. 2 is a block diagram for explaining another example of communication carried out in the above embodiment.
Figure 3A:
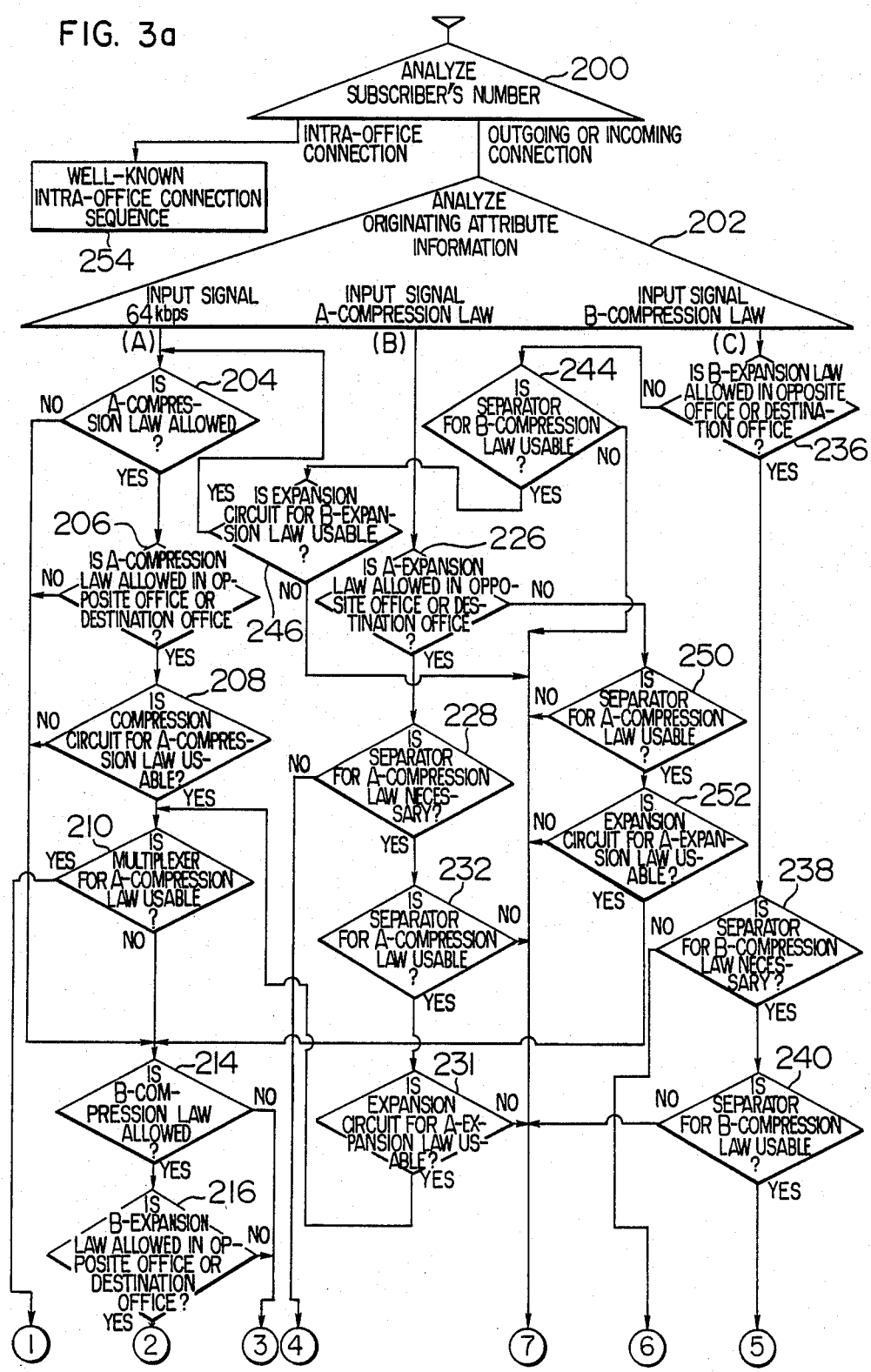
FIGS. 3a and 3b show a flow chart for explaining the above examples of communication carried out in the embodiment, in detail.
Figure 3B:
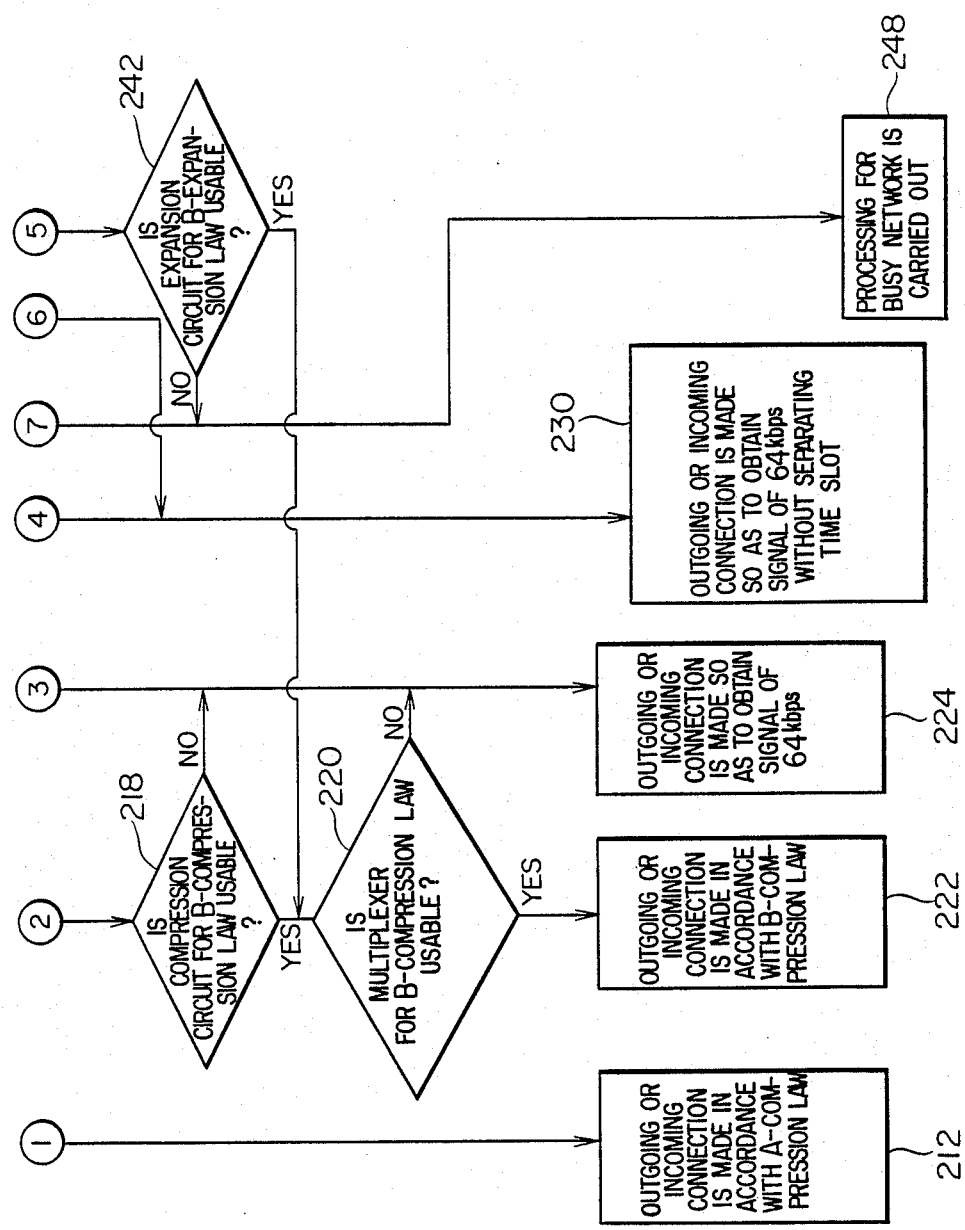
Figure 6A:
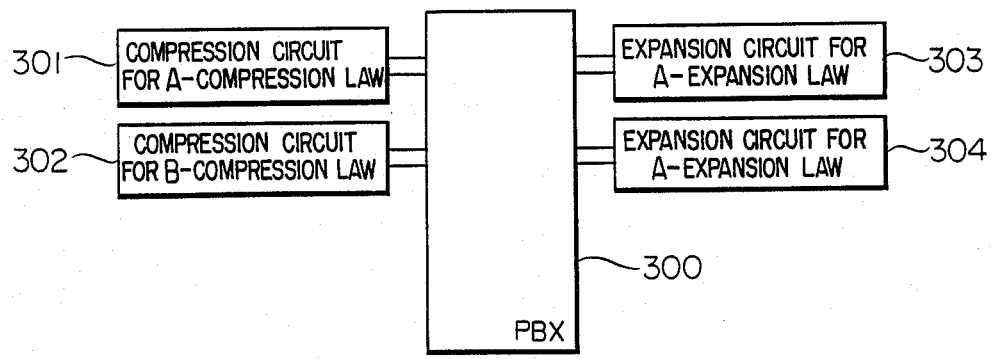
FIGS. 6a to 6c are block diagrams showing examples of a time division PBX used in the above embodiment.
Figure 6B:
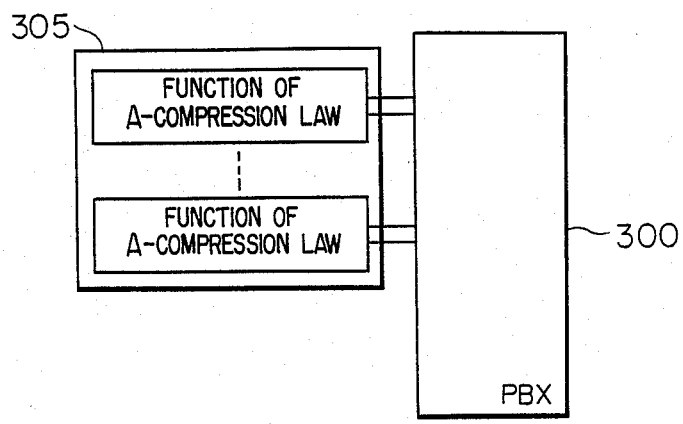
Figure 6C:
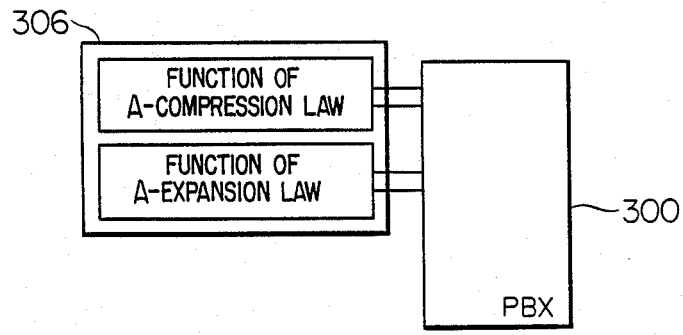

Now, explanation will be made of an embodiment of a time division exchange system according to the present invention, with reference to the accompanying drawings, in which: FIGS. 1 and 2 are block diagrams for explaining examples of communication carried out in an embodiment of a time division exchange system according to the present invention; FIGS. 3a and 3b are a flow chart for explaining the examples of communication in detail; FIGS. 4a to 4d show some examples of the format of the end user's information transmitted between a PBX and a transmission apparatus; FIGS. 5a to 5d show a common channel signal transmitted between two PBX's; and FIGS. 6a to 6c are block diagrams showing examples of a time division PBX used in the above embodiment.

In FIGS. 1 and 2, reference numerals 101, 102 and 105 designate calling telephone subscribers, 131, 132 and 135 called telephone subscribers, 103 and 104 facsimile subscribers on the transmitting side, 133 and 134 facsimile subscribers on the receiving side, 106 and 136 PBX switches, 107 and 137 controllers included in PBX's, 108 and 109 compression circuits for compressing a signal in accordance with an A-compression law, for example, compression circuits for converting a signal of 64 Kbps applied to an input terminal 108a or 109a, into a signal of 16 Kbps which is delivered from an output terminal 108b or 109b, 112 a multiplexer for combining four signals which have been compressed in accordance with the A-compression law, into a multiple signal, for example, a multiplexer for converting four signals of 16 Kbps applied to input terminals 112a to 112d into a multiple signal of 64 Kbps which is delivered from an output terminal 112e, 110 and 111 compression circuits for compressing a signal in accordance with a B-compression law, for example, compression circuits for converting a signal applied to an input terminal 110a or 111a, into a signal of 32 Kbps which is delivered from an output terminal 110b or 111b, 113 a multiplexer for combining two signals which have been compressed in accordance with the B-compression law, into a multiple signal, for example, a multiplexer for converting two signals of 32 Kbps applied to input terminals 113a and 113b into a multiple signal of 64 Kbps which is delivered from an output terminal 113c, 114 and 144 multiplex collection/delivery transmission apparatuses provided between the PBX switches 106 and 136, 160 a multiplex transmission line between the transmission apparatuses 114 and 144, 115, 116, 145 and 146 links serving as channels between the PBX switches 106 and 136 (for example, each link is a digital link of 64 Kbps), and 117 and 147 common-channel-signal paths between the PBX switches 106 and 136. Signals on the links 115 and 116 and the signal path 117 are combined by the multiplex transmission apparatus 114 into a multiple signal, which is sent to the multiplex transmission line 160. The multiple signal from the transmission line 160 is received by the multiplex transmission apparatus 144, and then delivered to the links 145 and 146 and the signal path 147.

Further, in FIGS. 1 and 2, reference numerals 138 and 139 designate expansion circuits for expanding a signal in accordance with an A-expansion law corresponding to the A-compression law, for example, compression circuits for converting a signal of 16 Kbps applied to an input terminal 138a or 139a into a signal of 64 Kbps which is delivered from an output terminal 138b or 139b, 142 a separation circuit for separating a multiple signal of 64 Kbps which is applied to an input terminal 142e and includes four signals having been compressed in accordance with the A-compression law, into four signals of 16 Kbps which are delivered from output terminals 142a to 142d, 143 a separation circuit for separating a multiple signal of 64 Kbps which is applied to an input terminal 143c and includes two signals having been compressed in accordance with the B-compression law, into two signals of 32 Kbps which are delivered from output terminals 143a and 143b, and 140 and 141 expansion circuits for expanding a signal in accordance with a B-expansion law corresponding to the B-compression law, for example, expansion circuits for converting a signal of 32 Kbps applied to an input terminal 140a or 141a into a signal of 64 Kbps which is delivered from an output terminal 140b or 141b.

FIGS. 5a to 5d show the format of a common channel signal which is sent from the controller 107 to the controller 137 through the signal paths 117 and 147, and is used for processing a call. It is to be noted that the format according to CCITT (Consultative Committee of International Telegram and Telephone) signalling system No. 7 is shown in FIGS. 5a to 5d. In FIG. 5a, reference symbol $F_0$ designates a start flag, $F_1$ an end flag, BSN a backward sequence number, BIB a bit for indicating the state of a backward sequence, FSN a forward sequence number, FIB a bit for indicating the state of a forward sequence, LI a length indicator, SIO a signal service indicator, and SIF a signal information part. FIG. 5b shows the signal information part SIF for the case of SIO=TUP. In the case of SIO=TUP (Telephone User Part), a call processing signal is indicated by the common channel signal, and the signal information part SIF contains information for processing a call. In FIG. 5b showing the SIF, reference symbol DPC designates the code of a destination office which receives a signal, OPC the code of an originating office which sends out the signal, CIC the number of the speech path between the destination office and the originating office, and $H_0$ and $H_1$ headers containing a code indicative of the kind of signal.

FIG. 5c shows the additional information of FIG. 5b for a case where the headers $H_0$ and $H_1$ take a value "0001" which indicates an information address message (that is, an originating information message). The kind of calling subscriber shown in FIG. 5c is expressed by a spare signal such as defined by FIG. 5d. It is to be noted that, according to CCITT. Rec., signals indicated by FEDCBA=001100−111111 are used as the spare signal. In the example shown in FIG. 5d, it is indicated whether a signal has been compressed in accordance with one of the A- and B-compression laws or has not been compressed. Further, in an office, compression career information on how many times signal compression corresponding to each compression law has been made between the originating office and the said office, is recorded in an information field as shown in FIG. 5d. The above compression career information is sent to the next office.

Now, a case where a voice signal is sent from the telephone subscriber 101 to the telephone subscriber 131 and another voice signal is sent from the telephone subscriber 102 to the telephone subscriber 132, will be explained in accordance with the flow chart of FIGS. 3a and 3b, by way of example.

Referring to FIGS. 3a and 3b, it is known in step 200 that the call from the subscriber 101 requires outgoing connection, that is, is a call for the PBX switch 136. In step 202, the controller 107 is informed that a signal of 64 Kbps is sent out. Accordingly, the following processing is carried out in accordance with a flow (A). Since a voice signal is sent out at the present call, it is judged in step 204 that the voice signal of 64 Kbps can be compressed to a signal of 16 Kbps. Further, it is judged in step 206 that the opposite office is provided with an expansion circuit for expanding a signal of 16 Kbps to a signal of 64 Kbps. When it is judged in steps 208 and 210 that the compression circuits 108 and 109 for the A-compression law and the multiplexer 112 for the A-compression law are all vacant, the processing is advanced to step 212 through a route ①. In step 212, the signal of 64 Kbps is compressed to a signal of 16 Kbps, and then sent out.

That is, the controller 107 connects the telephone subscriber 101 to the input terminal 108a of the compression circuit 108 for the A-compression law, and connects the output terminal 108b of the circuit 108 to an input terminal 112a of the multiplexer 112 for the A-compression law, with the aid of the switching function of the PBX switch 106. Similarly, the controller 107 connects the telephone subscriber 102 to the input terminal 109a of the compression circuit 109 for the A-compression law, and connects the output terminal 109b of the circuit 109 to another input terminal 112b of the multiplexer 112. Further, the controller 107 connects the output terminal 112e of the multiplexer 112 to the link 115.

Figure 4A:
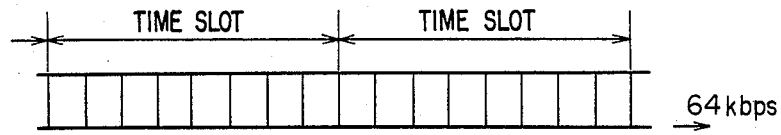
FIGS. 4a to 4d show some examples of a signal format used on a link which acts as a channel between a PBX and a transmission apparatus.
Figure 4B:
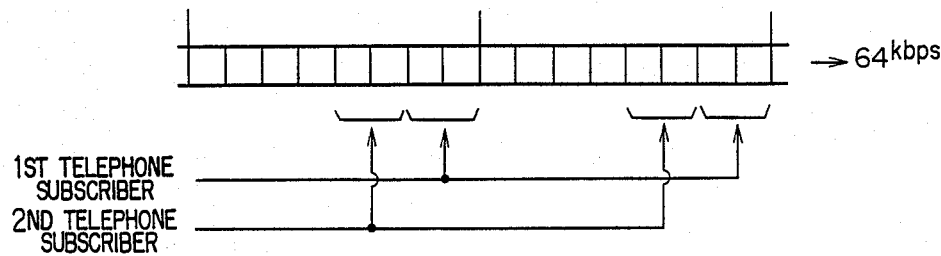
Figure 4C:
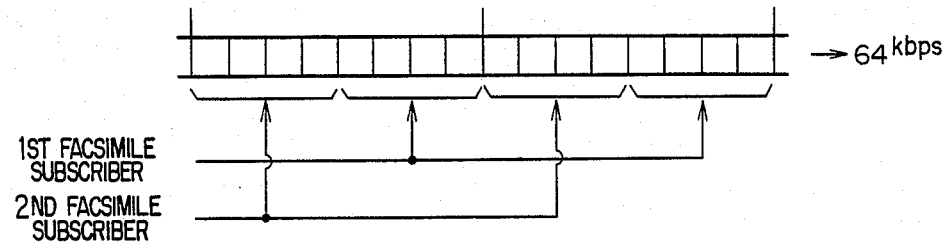
Figure 4D:
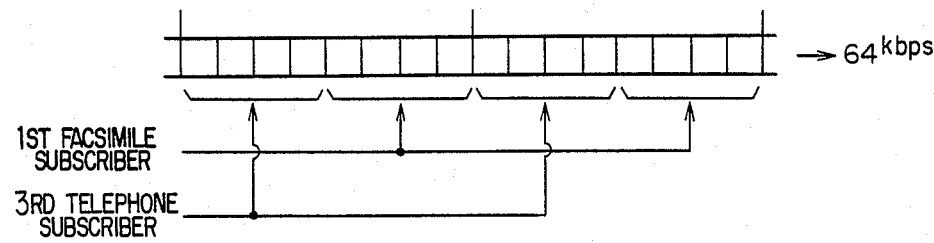

In this case, the signal on the link 115 has such a format as shown in FIG. 4b. In an ordinary case, the link 115 serves as a digital path of 64 Kbps, and is sampled at intervals of 8 Kbps. Thus, one time slot includes eight bits, as shown in FIG. 4a. Two voice signals each compressed to a signal of 16 Kbps are combined by the multiplexer 112 and sent out as shown in FIG. 4b. Further, the common channel signal sent out from the controller 107 reaches the multiplex collection/delivery transmission apparatus 114 through the signal path 117. In FIG. 1, the common channel signal passes through the PBX switch 106. However, it is not always required that the common channel signal passes through the PBX switch 106. Those parts of the common channel signal shown in FIGS. 5a to 5d which are peculiar to the present invention, are information indicating the fact that the voice signal has been compressed in accordance with the A-compression law and compression career information indicating the fact that signal compression according to the A-compression law has been made only once.

On the receiving side, the multiplex collection/delivery transmission apparatus 144 receives the multiple signal on the multiplex transmission line 160, and distributes the multiple signal among the links 145 and 146 and the signal path 147. In the present case, a control signal is sent to the controller 137 through the signal path 147, and thus it is known that the link 145 receives a multiple signal which is made up of two compressed voice signals of 16 Kbps. Further, the control signal informs the controller 137 that a signal having been compressed in accordance with the A-compression law is received (step 202), and thus the following processing is carried out in accordance with a flow (B). In the present case, it is assumed that a signal of 64 Kbps is received by the destination subscriber. Accordingly, it is judged in step 226 that the A-expansion law is not allowed in the opposite office. Then, it is judged in step 250 that the separation circuit 142 for the A-compression law is usable. After steps 252 and 214, it is judged in step 216 that the B-expansion law is not allowed. Thus, the processing is advanced to step 224 through a route ③. In step 224, incoming connection is made so that a signal of 64 Kbps is received by the called subscriber.

That is, the controller 137 connects the link 145 to the input terminal 142e of the separation circuit 142, connects an output terminal 142a of the circuit 142 to the input terminal 138a of the expansion circuit 138, connects another output terminal 142b of the separation circuit 142 to the input terminal 139a of the expansion circuit 139, connects the output terminal 138b of the expansion circuit 138 to the telephone subscriber 131, and connects the output terminal 139b of the expansion circuit 139 to the telephone subscriber 132, with the aid of the switching function of the PBX switch 136.

In this case, the voice of the telephone subscriber 101 is sent in the form of a signal of 64 Kbps between the subscriber 101 and the terminal 108a, in the form of a signal of 16 Kbps between the terminal 108b and 138a, and in the form of a signal of 64 Kbps between the terminal 138b and the telephone subscriber 131.

Next, the communication between the facsimile subscribers 103 and 133 and the communication between the facsimile subscribers 104 and 134 will be explained, by reference to FIGS. 2, 3a and 3b. When a signal of 64 Kbps is sent out from the facsimile 103, the controller 107 is informed that the present call is a facsimile call and the signal is sent to the facsimile subscriber 133 connected to the PBX switch 136 (step 202). Thus, the following processing is carried out in accordance with the flow (A) of FIG. 3a. Since the present call is the facsimile call, it is judged in step 204 that the A-compression law is not allowed. Thus, it is judged in step 214 whether or not the B-compression law is allowed. The B-compression law for compressing a signal of 64 Kbps to a signal of 32 Kbps is allowed (step 214). Further, it is judged in step 216 that the expansion of a signal of 32 Kbps to a signal of 64 Kbps is allowed in the opposite office. Thus, the processing is advanced to step 218 through a route ②. It is judged in step 218 that the compression circuits 110 and 111 for the B-compression law are usable. Further, it is judged in step 220 that the multiplexer 113 for the B-compression law is usable. Thus, outgoing connection is made in accordance with the B-compression law (step 222).

That is, the controller 107 connects the facsimile subscriber 103 to the input terminal 110a of the compression circuit 110 for the B-compression law, and connects the output terminal 110b of the circuit 110 to an input terminal 113a of the multiplexer 113 for the B-compression law, with the aid of the switching function of the PBX switch 106. Similarly, the facsimile subscriber 104 is connected to the input terminal 111a of the compression circuit 111 for the B-compression law, and the output terminal 111b of the circuit 111 is connected to another input terminal 113b of the multiplexer 113. Further, the output terminal 113c of the multiplexer 113 is connected to the link 115.

Similarly to the case where a voice signal is transmitted, a control signal is received by the receiving side through the signal path 147. Thus, it is known in step 202 that the present call is a facsimile call and a compressed signal of 32 Kbps is received. Hence, the following processing is carried out in accordance with a flow (C). When it is assumed in step 236 that a signal of 64 Kbps is received by the destination facsimile, the flow (C) will join the flow (A). In more detail, it is judged in step 244 that the separation circuit 143 for the B-compression law is usable. Further, it is judged in step 246 that the expansion circuits 140 and 141 for the B-expansion law are usable. Thus, incoming connection is made so that a signal of 64 Kbps is received by the destination facsimile (step 224). That is, the controller 137 connects the link 145 to the input terminal 143c of the separation circuit 143, connects an output terminal 143a of the circuit 143 to the input terminal 140a of the expansion circuit 140, and connects the output terminal 140b of the circuit 140 to the facsimile subscriber 133, with the aid of the switching function of the PBX switch 136. Similarly, another output terminal 143b of the separation circuit 143 is connected to the input terminal 141a of the expansion circuit 141, and the output terminal 141b of the circuit 141 is connected to the facsimile subscriber 134. In the present case, a signal from the facsimile subscriber 103 is sent in the form of a signal of 64 Kbps between the facsimile subscriber 103 and the input terminal 110a of the compression circuit 110, and between the output terminal 140b of the expansion circuit 140 and the facsimile subscriber 133. However, the above signal is sent in the form of a signal of 32 Kbps between the terminals 110b and 113a, between the terminal 113c and the link 115, between the link 145 and the terminal 143c, and between the terminals 143a and 140a. Further, the multiple signal on the link 115 has the format shown in FIG. 4c.

As can be seen from FIGS. 1 and 2, a single digital link in logical and physical senses such as the link 115 or 145 transmits a compressed signal of 16 Kbps at a time, and transmits a compressed signal of 32 Kbps at another time. Accordingly, it is preferable that a compressed signal of 16 Kbps is transmitted by the digital link in a period when voice traffic increases, and a compressed signal of 32 Kbps from a facsimile subscriber is transmitted in another period.

Next, a case where the communication between the facsimile subscribers 103 and 133 and the communication between the telephone subscribers 105 and 135 are generated in a period when the telephone communication between the subscribers 101 and 131 and the telephone communication between the subscribers 102 and 132 are made as explained above, will be explained with reference to FIG. 1. The communication between the facsimile subscribers 103 and 133 is made in the form of a signal of 32 Kbps, as has been explained with reference to FIG. 2. However, the links 115 and 145 have been already used for the telephone communication between the subscribers 101 and 131 and the telephone communication between the subscribers 102 and 132. Accordingly, the links 116 and 146 are used for the facsimile communication between the subscribers 103 and 133. The circuit connection for the facsimile communication other than the above-mentioned is the same as shown in FIG. 2.

Further, the controller 107 is informed that the signal from the telephone subscriber 105 is a voice signal. Accordingly, the processing on the transmitting side is carried out in accordance with the flow (A) of FIG. 3c. Unlike the case where voice signals were sent out from the telephone subscribers 101 and 102, the compression circuits 108 and 109 for the A-compression law are busy, and the digital links 115 and 116 have been used.

Thus, the ordinary outgoing connection for supplying the called subscriber with a signal of 64 Kbps cannot be made. However, the compression circuit 111 for the B-compression law and the input terminal 113b of the multiplexer 113 are both vacant, and hence the flow (A) of FIG. 3a can be processed in the following manner. It is judged in step 204 that the A-compression law is not allowed, it is judged in step 214 that the B-compression law is allowed for a voice signal, and it is judged in step 216 that the B-expansion law is allowed in the opposite office. Thus, the processing is advance to step 218 through a route ②. It is judged in step 218 that the compression circuit 111 for the B-compression law is usable, and it is judged in step 220 that the multiplexer 113 for the B-compression law is usable. Thus, the outgoing connection is made in accordance with the B-compression law (step 222).

That is, the controller 107 connects the telephone subscriber 105 to the input terminal 111a of the compression circuit 111 for the B-compression law, and connects the output terminal 111b of the circuit 111 to the input terminal 113b of the multiplexer 113, with the aid of the switching function of the PBX switch 106. At this time, a multiple signal on the link 116 has the format shown in FIG. 4d. That is, each of the voice signal and the facsimile signal is sent out in the form of a compressed signal of 32 Kbps.

On the receiving side, the output terminal 143b of the separation circuit 143 is connected to the input terminal 141a of the expansion circuit 141 for the B-expansion law, and the output terminal 141b of the circuit 141 is connected to the telephone subscriber 135.

That is, even in a case where voice traffic increases, so that the compression circuits for the A-compression law are all busy and no link is completely vacant, a voice signal can be transmitted in the form of a compressed signal of 32 Kbps.

In the foregoing, explanation has been made of the communication between an originating office and an opposite office, for convenience's sake. In a case where a tandem switching stage is required, a tandem switch performs substantially the same operation as in the originating and opposite offices, and moreover has a compression counting function shown in FIG. 5d. That is, the compression career information indicative of compression laws used in the transmitting office and the tandem switch is obtained by the above function. For example, in the communication of FIG. 2, a numeral 1 (one) is added to the B-compression counter contained in the originating information from the facsimile subscriber 103, in the transmitting office. The B-compression counter thus obtained is sent to the opposite office. At a receiving office, and allowable frequency of each compression law and an allowable combination of compression laws are previously determined for each of media, and signal compression which does not meet the allowable conditions, is prevented. Thus, the degradation of signal due to the repetition of compression and expansion can be prevented.

In the foregoing description, a simple transmission system has been used, for convenience of explanation. PBX's such as shown in FIGS. 6a to 6c may be used in the circuit arrangement of FIGS. 1 and 2. FIG. 6a shows a case where a PBX 300 includes a compression circuit 301 for the A-compression law, a compression circuit 302 for the B-compression law, and expansion circuits 303 and 304 for the A-expansion law. In this case, the compression circuits 301 and 302 do not correspond to the expansion circuits 303 and 304. FIG. 6b shows a case where the PBX 300 includes a compression unit 305 which is made up of a plurality of compression circuits. FIG. 6c shows a case where the PBX 300 includes a unit 306 which is made up of a compression circuit and an expansion circuit corresponding thereto.

In the foregoing explanation, a common channel signal has been used between a pair of PBX's. It is needless to say that a conventional individual channel signal may be used in a transmission system according to the present invention.

As has been explained in the foregoing, according to the present invention, there is provided a transmission system including multiplex collection/delivery apparatuses between a pair of PBX's, in which system the compression law used at each time slot is changed dynamically in accordance with variations in traffic, to enhance the transmission efficiency, and to prevent the generation of queue, thereby improving the quality of communication service.

We claim:

1. A time division exchange system having a function of compressing information such as an input signal on the transmitting side and a function of expanding the information on the receiving side, comprising:
   an originating office;
   a destination office; and a tandem switch connected between said originating office and said destination office to effect communication therebetween, said tandem switch including:
   (a) at least one compression means for compressing information such as an input signal in a accordance with one of a plurality of compression laws;
   (b) at least one expansion means for expanding information such as an input signal in accordance with one of a plurality of expansion laws; and
   (c) switching means for applying the to-be-compressed information selectively to compression means which carries out signal compression according to a desired compression law, at each time slot, and for applying the to-be-expanded information selectively to expansion means which carries out signal expansion in accordance with an expansion law corresponding to the desired compression law, at each time slot;
   (d) means for counting the frequency of each compression law and for sending compression career information to the destination office; and
   (e) means for receiving compression career information from the originating office and for judging whether or not received compression career information meets a predetermined condition and for preventing further signal compression when the received compression career information fails to meet the predetermined condition.

2. A time division exchange system comprising:
   a plurality of compression means for compressing a signal in accordance with one of a plurality of compression laws;
   at least one multiplexer for combining a plurality of signals, which have been compressed by said plurality of compression means, into a first multiple signal;
   a plurality of expansion means for expanding a signal in accordance with one of a plurality of expansion laws;
   at least one separation means for separating said first multiple signal into a plurality of individual signals;
   transmission means for combining a plurality of signals into a second multiple signal, for transmitting said second multiple signal, and for separating said transmitted second multiple signal into a plurality of signals;
   a plurality of first subscribers;
   a plurality of second subscribers;
   first switching means for selecting one of said plurality of compression means and one of a plurality of multiplexers at each time slot on the basis of a signal from one of said first subscribers, and for connecting the one first subscriber and an input terminal of the selected compression means, an output terminal of the selected compression means and an input terminal of the selected multiplexer, and an output terminal of the selected multiplexer and one end of the transmission means, at each time slot; and
   second switching means for selecting one of a plurality of separation means corresponding to the selected multiplexer and one of said plurality of expansion means corresponding to the selected compression means at each time slot, and for connecting the other end of the transmission means and an input terminal of the selected separation means, an output terminal of the selected separation means and an input terminal of the selected expansion means, and an output terminal of the selected expansion means and a predetermined one of the second subscribers, at each time slot.

3. A time division exchange system according to claim 2, wherein a signal path for sending a common channel signal is provided between said first switching means and said second switching means, and information on a compression law which has been used, is sent from said first switching means to said second switching means through said signal path.

4. A time division exchange system according to claim 2, wherein said transmission means includes at least one tandem switch provided between said first switching means and said second switching means, and wherein said tandem switch is provided with means for counting the frequency of each compression law and for sending compression career information to the second switching means and means for receiving compression career information from the first switching means and for judging whether or not received compression career information meets a predetermined condition, and for preventing further signal compression when the received compression career information fails to meet the predetermined condition.

5. A time division exchange system according to claim 3, wherein compression career information is sent through said signal path.

6. A time division exchange system according to claim 3, wherein multiplex transmission means for combining the common channel signal on said signal path and a signal on a link which serves as a speech path, into a second multiple signal, is provided on the first switching means side, and wherein delivery means for receiving said second multiple signal from said multiplex transmission means, and for dividing said second multiple signal into said common channel signal and said signal on said link, is provided on the second switching means side.

7. A time division exchange system according to claim 2, wherein said plurality of compression means include a circuit for compressing a signal of 64 Kbps to a signal of 16 Kbps and a circuit for compressing a signal of 64 Kbps to a signal of 32 Kbps, said plurality of expansion means include a circuit for expanding a signal of 16KBPS to a signal of 64 Kbps and a circuit for expanding a signal of 32 Kbps to a signal of 64 Kbps, said plurality of multiplexers include a circuit for combining four signals of 16 Kbps into a multiple signal of 64 Kbps and a circuit for combining two signals of 32 Kbps into a multiple signal of 62 Kbps, and said plurality of separation means include a circuit for separating a multiple signal of 64 Kbps into four signals of 16 Kbps and a circuit for separating a multiple signal of 64 Kbps into two signals of 32 Kbps.

8. A time division exchange system according to claim 2, wherein said first subscribers include a plurality of telephone subscribers and a plurality of facsimile subscribers, and said second subscribers include a plurality of telephone subscribers and a plurality of facsimile subscribers.

* * * * *